United States Patent [19]
Miyata

[11] Patent Number: 5,198,898
[45] Date of Patent: Mar. 30, 1993

[54] DATA COMPRESSING SYSTEM FOR COMPRESSING SERIAL IMAGE DATA WITH COLOR INFORMATION

[75] Inventor: Masahiko Miyata, Kanagawa, Japan

[73] Assignee: Fuji Xerox Co., Ltd., Tokyo, Japan

[21] Appl. No.: 594,129

[22] Filed: Oct. 10, 1990

[51] Int. Cl.$^5$ .............................................. H04N 1/46
[52] U.S. Cl. ...................................... 358/75; 358/78; 358/80; 358/461; 382/56
[58] Field of Search ................. 358/75, 76, 79, 80, 358/455, 458, 461; 382/56

[56] References Cited

U.S. PATENT DOCUMENTS

| | | | |
|---|---|---|---|
| 4,896,208 | 1/1990 | Morita et al. | 358/78 |
| 4,931,860 | 6/1990 | Narumiya | 358/75 |
| 4,937,662 | 6/1990 | Matsunawa et al. | 358/461 |
| 4,980,758 | 12/1990 | Matsunawa et al. | 358/75 |
| 4,980,760 | 12/1990 | Hiratsuka et al. | 358/80 |

*Primary Examiner*—Jose L. Couso
*Attorney, Agent, or Firm*—Finnegan, Henderson, Farabow, Garrett & Dunner

[57] ABSTRACT

A system for compressing image data composed of monochromatic and color pixels with color information in which the compression efficiency of monochromatic pixels is enhanced. Each pixel includes a color flag having the value "0" if the pixel is monochromatic, "1" if the pixel is color. The remaining bits of each pixel are used for expressing gradation image data. Before applying a pixel to a compressor, if the bits expressing the gradation image data are all "1's", the color flag of "0" is set to "1", and vice versa.

17 Claims, 6 Drawing Sheets

FIG. 3
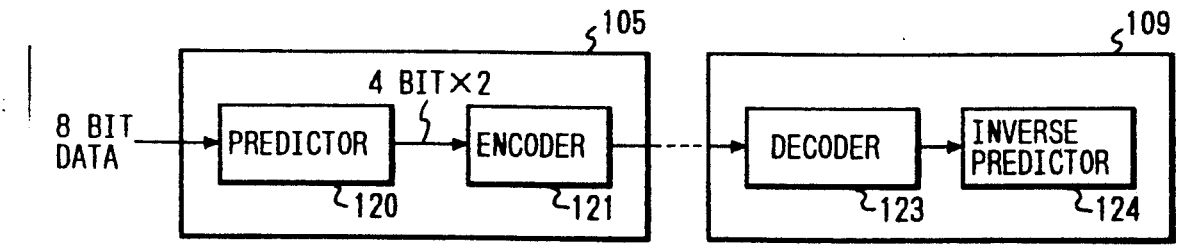
FIG. 4(a) PREVIOUS LINE / PRESENT LINE
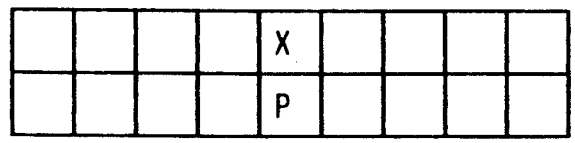
FIG. 4(b) PRESENT LINE
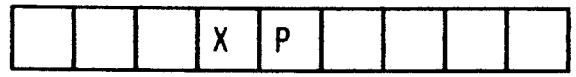
FIG. 4(c) PREVIOUS LINE / PRESENT LINE
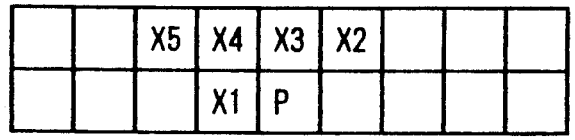
FIG. 4(d) PRESENT LINE
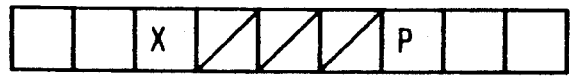
FIG. 5
8-BIT DATA
ERROR DATA
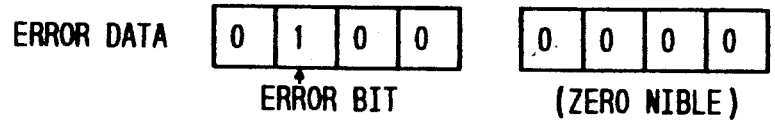
ERROR BIT        (ZERO NIBLE)

FIG. 6

| TA | 0001, 0010, 0100, 1000 |
|---|---|
| TB | ERROR DATA OF 4 BITS THAT ARE OTHER THAN TA AND THE ZERO NIBLE |

| aa | tttt |
|---|---|
| 00 | 1000 |
| 01 | 0100 |
| 10 | 0010 |
| 11 | 0001 |

| bbbb | tttt |
|---|---|
| 0100 | 0011 |
| 0101 | 0101 |
| 0110 | 0110 |
| 0111 | 0111 |
| 1001 | 1001 |
| 1010 | 1010 |
| 1011 | 1011 |
| 1100 | 1100 |
| 1101 | 1101 |
| 1110 | 1110 |
| 1111 | 1111 |

FIG. 8

| 0 | 10aa |
|---|---|
| 1~25 | 0rrrrraa |
| 26~63 | 11rrrrrrtttt |
| 64~89 | 11ssssssstttt |

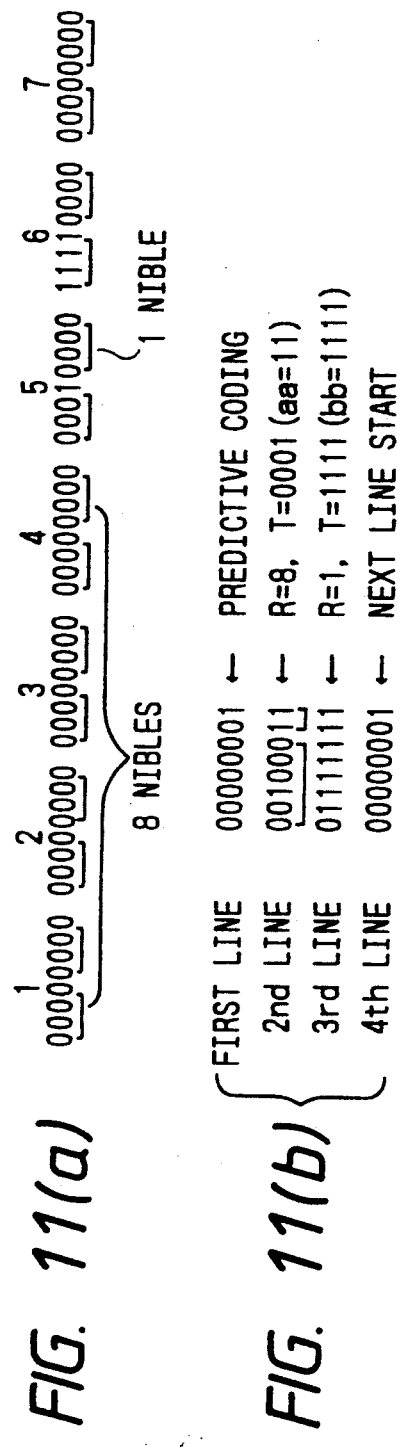

FIG. 12
| ---- | b32 | b31 | b30 | b22 | b21 | b20 | b12 | b11 | b10 | b02 | b01 | b00 |
→ INPUT
FIG. 13
| bn2 | bn1 | bn0 | |
|-----|-----|-----|------|
| 0 | 0 | 0 | WHITE |
| 0 | 0 | 1 | G1 |
| 0 | 1 | 0 | G2 |
| 0 | 1 | 1 | TRUE RED |
| 1 | 0 | 0 | WHITE |
| 1 | 0 | 1 | RED G1 |
| 1 | 1 | 0 | RED G2 |
| 1 | 1 | 1 | BLACK |
FIG. 14
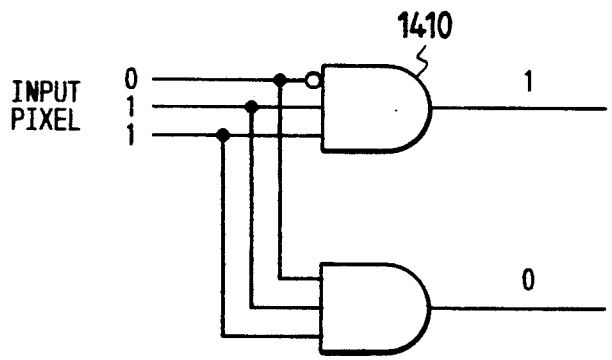
FIG. 15
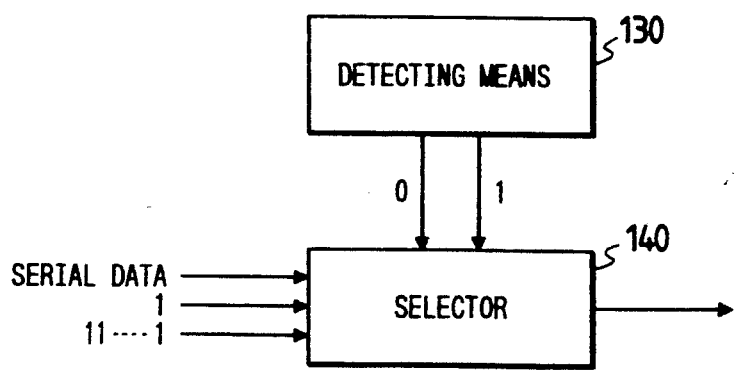

DATA COMPRESSING SYSTEM FOR COMPRESSING SERIAL IMAGE DATA WITH COLOR INFORMATION

BACKGROUND OF THE INVENTION

1. Field of the Invention

This invention relates generally to a data processing system for compressing image data, and more particularly to a system for compressing image data organized in multiple bit pixels.

2. Discussion of the Related Art

In an image processing system it is typically desirable to compress image data. If the image data is being stored, compression of the data conserves the amount of storage space used. If the image data is being transferred over a communication line, compression of the data reduces bandwidth requirements or reduces transmission time.

Many compressors employ a run-length encoder that encodes sections of the input data containing a run of zeros into a number indicating the number of zeros successively appearing in the input data. Another type of encoder uses a two dimensional encoding system that encodes based on a correlation in the vertical as well as the horizontal direction.

One or two dimensional encoding is suitable for image data because image data tends to have the same type of data within a given area. Before processing image data with a run-length encoder, however, it is desirable to precondition the data to increase the number of successive zeros with a "predictor". A predictor predicts the value of the next pixel on the basis of values of pixels already processed.

In the case of the image data of the plus 1 color in which monochromatic image information additively contains one color or the plus 2 color, when the color flag and gradation information are encoded, color image information infrequently appears, while text image information frequently appears. Particularly for the text image, data of white or black information, which frequently and successively appear, must be compressed in a high redundancy reduction efficiency; otherwise it is difficult to improve the redundancy reduction efficiency of the overall image data. For this reason, an approach to simply assign codes to the monochromatic image data and the color image data and apply the predictive encoding system to the encoding, fails to attain a satisfactory redundancy reduction efficiency.

FIG. 1 is a diagram of a proposed pixel code assignment. For the serial image data having 3 bits per pixel, as shown in FIG. 1, the least significant bit is used for a color flag, and the two low-order bits are used for expressing gradation.

The color flag is set to "0" for a monochromatic pixel or "1" for a color (red) pixel. In the case of the plus 1 color image, "000" is assigned to white; "001" to G1; "010" to G2; and "011" to black. "100" is assigned to white (or not used); "101", to red G1; "110" to red G2; and "111", to true red.

Using the pixel code assignment of FIG. 1, in text image, for example, when black data is successive, "011 011 011 . . . ," is difficult to encode such data directly with the run-length coding system. Further, there may be no predictor available to effectively make this series of bits easy to encode.

SUMMARY OF THE INVENTION

An object of the present invention to provide a data compressing system for compressing serial image data with color data, which can compress in a high redundancy reduction efficiency white or black data in the text image data.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects, according to one aspect of the present invention a method of representing a unit of data having one of N values of gradation and being either of a first type or a second type with digits capable of assuming a first value and a second value different from the first value, comprises the steps of representing a first type unit having one of $N-1$ values of gradation with a type digit of a first value and with gradation digits at least one of which is of the first value; and representing a first type unit having a value of gradation different than all of the $N-1$ values of gradation of the preceding step with a type digit of a second value and with gradation digits all of the second value.

According to another aspect of the present invention, in a system having data represented by a word for each unit of data, each word having a type digit for designating a plurality of types and a plurality of gradation digits for designating a plurality of gradations, each digit being capable of assuming a first value and a second value different than the first value, an apparatus for compressing a series of words comprises means for translating a word having a type digit of the first value and gradation digits all of the second value into a translated word having a type digit of the second value and gradation digits all of the second value; and means, coupled to the translating means, for applying the translated word to a compressor.

The accompanying drawings, which are incorporated in and constitute a part of this specification illustrated embodiment of the invention and, together with the description, serve to explain the object, advantages and principles of the invention.

BRIEF DESCRIPTION OF THE DRAWINGS

FIG. 3 is a block diagram showing a compressor unit and a decompressor unit that are used in the image processing system shown in FIG. 2.

FIGS. 4(a) through 4(d) are diagrams for explaining various types of predictors.

FIG. 5 is a diagram for explaining error data generated by a predictor.

FIG. 6 is a diagram showing terminator codes for delineating runs of zeros.

FIGS. 7(a) and 7(b) are diagrams for explaining the selection of a terminator code.

FIGS. 8 to 10 are diagrams for explaining the coding of runs of various lengths.

FIGS. 11(a) and 11(b) are diagrams illustrating the encoding of a bit series generated by the prediction unit.

FIG. 12 is a diagram showing input serial data.

FIG. 13 is a diagram showing the encoding of the image data with color information.

FIG. 14 is a diagram showing a circuit for detecting gradation data of all "1's".

FIG. 15 is a block diagram showing a circuit to express black by "11 ... 1".

DESCRIPTION OF THE PREFERRED EMBODIMENTS

An embodiment of a data compressing method in use for an image processing system will be described with reference to the accompanying drawings.

Figure 2:
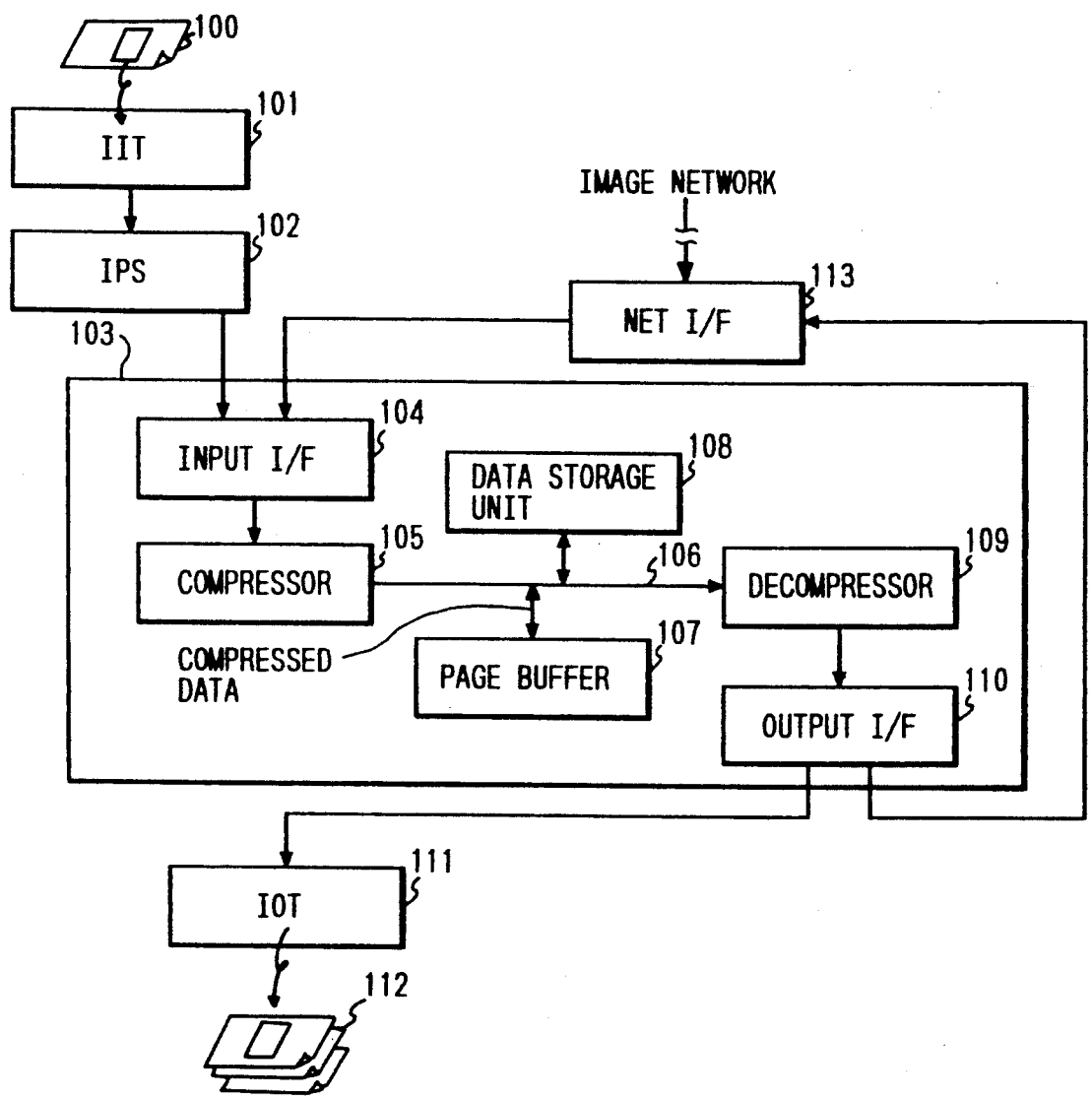
FIG. 2 is a block diagram showing an image processing system in which a data compressing method according the preferred embodiment of the present invention is applied.

FIG. 2 is a block diagram showing an image processing system in which a data compressing method according to the present invention is applied. FIG. 2 shows a document 100, an image input terminal (IIT) 101, an image data processing unit (IPS) 102, a compandor section 103, an input interface (I/F) 104, a data compressor unit 105, a transmission line 106, a page buffer 107, an image data storage unit 108, an expander or decompressor unit 109, an output interface (I/F) 110, an image output terminal (IOT) 111, a copy/print output unit 112, and a network interface (I/F) 113.

Image data obtained by scanning the surface of document 100 by IIT 101 is processed by the IPS 102, and is transferred to compandor unit 103, through input I/F 104. Image data generated by I/F 104 is compressed by compressor unit 105, as will be described in detail later. Each page of the compressed data is either stored into page buffer 107 or is directly transferred to decompressor unit 109 where it is decompressed. The decompressed image data is transferred through output I/F 110 to IOT 111. The image data is also transferred to an image network, through output I/F 110 and network I/F 113. The image processing system is capable of receiving image data from the image network for compression, decompression, and reproduction. Further, the image data as compressed by compressor unit 105 is stored into image data storage unit 108 and may be output at a later time.

FIG. 3 shows compressor unit 105 in series with decompressor unit 109. In compressor unit 105, input data is first processed by predictor 120. The output of predictor 120 will tend to have longer runs of zero than the input of predictor unit 120.

Predictor unit 120 contains 15 predictors of 4 different types. The first type of the predictor is a bit-above predictor shown in FIG. 4(a). The bit-above predictor predicts a value of a pixel P by referring to a value of a bit X located at the corresponding horizontal position in the previous line.

The second type of the predictor is a pre-bit predictor shown in FIG. 4(b). The pre-bit predictor predicts a value of a bit P by referring to a value of a bit X immediately preceding bit P.

The third type of the predictor is a font (five elements) predictor shown in FIG. 4(c). The font predictor predicts a value of a bit P on the basis of the statistical result of states of five reference pixels X1, X2, X3, X4 and X5.

The fourth type of predictors is of the halftone type. There are 12 halftone type predictors. Each of the 12 halftone predictor uses a reference bit preceding predictive bit P by 5 to 16 bits respectively, as generally shown in FIG. 4(d).

In order to implement each of the predictors described above, predictor unit 120 contains a memory to enable it to refer to the 16 bits preceding the predictive bit, and to the bits of the previous line.

The adaptive prediction process operates as follows. For the selection of one of the predictors, a predictor priority order is initialized at the beginning of each line. The priority order at the beginning of a line is as follows:

(1) 5 element predictor
(2) bit-above predictor
(3) pre-bit predictor
(4) halftone predictor of the shortest pattern length After priority order initialization, the predictors are selected in the following way. If the previous 8-bit data was predicted with no error, the predictor used to predict the previous 8-bit data is used for the current 8-bit data. If the predictor used for the previous 8-bit data produced an error, the predictor that produces the least amount of error for the previous 8-bit data is selected among from the predictors in the priority order of (1) to (4). In case where the predictor previously used produces an error and the other predictors are successively selected and used in the priority order and each produces an error equal to that of the previously used predictor, the previously used predictor is used for the current 8-bit data.

Predictor unit 120 receives 8-bit data, and produces error data every four bits.

FIG. 5 is a diagram for explaining error data generated by predictor unit 120. As shown, the predictor unit 120 sequentially receives 8-bit data. Then, in the predictor unit, a predictor is selected in accordance with the rules described earlier. Predictor unit 120 produces error data every four bits (nibble). When an error is 0, the error data is a zero nibble (0000). When an error occurs, the bit of the error is set to "1", and the error data might be (0100), for example.

Encoder 121 encodes the data generated by predictor unit 120. The data generated by predictor 120 will consist of runs of zero nibbles in dispersed with nonzero nibbles. Encoder 121 encodes the runs of zero nibbles with a run-length and a terminator code. A terminator code is selected based on the bit pattern of the first nonzero nibble after a run of zero nibbles. In other words, terminator codes are selected depending on the types of the error data.

FIG. 6 is a chart associating types of error data with a terminator code. In the case of the error data containing a single error bit, such as 0001, 0010, 0100, and 1000, the terminator code is TA. In the case of other error data than the terminator TA and not containing the 0 nibble, i.e., the error data containing a plurality of error bits, the terminator code is TB.

For the terminator code TA, the error data is encoded tttt→aa; 0001→00, 0010→01, 0100→10, and 1000→11 (see FIG. 7(a)).

FIG. 7(b) shows that in the case of the terminator code TB, the error data is encoded rrrr→bb; 0011→0100, 0101→0101, 0110→0110, 0111→0111, 1001→1001, 1010→1010, 1011→1011, 1100→110, 1101→1101, 1110→1110, and 1111→1111 (see FIG. 7(b)).

FIG. 8 shows the encoding of a run of the zero nibbles in accordance with the run-length and the terminator codes case by case. Consider a case where a run-length of zero is delineated by error data containing a single error bit (terminator code TA). In this case, the run-length of 0 is expressed by 10aa. Run-lengths of 1 to 25 are designated by 0rrr rraa, 26 to 63 by 11rr rrr tttt, and 64 to 89 by 11ss ssss tttt. The Codes rrrrr and rrrrrr denote a binary expression of the run-length. The code ssssss denotes a binary expression of the result of subtraction of 64 from the run-length.

In the case of the terminator code TB for the error data containing a plurality of error bits, the run-length of 0 or 1 is expressed by 011b bbbr. The run-lengths of 2 to 63, by 11rr rrrr tttt. Here, tttt is encoded by bbbb shown in FIG. 6.

Run-lengths too long to be encoded by the scheme shown in FIGS. 8 and 9 are encoded in the form of a multiple of 64 number of 0 nibbles. FIG. 10 shows the encoding of long run-lengths as 11rr rrrr 0000 where rrrrrr is a binary value obtained by dividing the run-length by 64. Run-lengths that are multiples of 64 in the range 64 to 4032 are encoded in this manner.

FIG. 11 shows an example of the processing of encoder 121. FIG. 11(a) is a series of bits applied to encoder 121 and FIG. 11(b) is the encoded version of the bit series of FIG. 11(a) generated by encoder 121.

In FIG. 11(b), "0000 0001" on the first line indicates a normal mode in which input data is predicted and then encoded. "0000 0001" is used for distinguishing the case of no prediction and no coding. The second line represents the 8 nibbles of successive "0" s from the beginning up to non-zero nibble containing "0001". The terminator code is TA, because the non-zero nibble contains a single error bit. Because the run-length is 8, this case corresponds to the second line of the table in FIG. 7, covering run-lengths between 1 and 25. Thus, "0" is the digit of the code. Next, the run-length of 8 is expressed by "1000" followed by the terminator "0001", because the code is 11 in the column of "aa" (see FIG. 7(a)). As a result, an 8- bit binary code of "0010 0011" of the second line is formed.

The third line represents the run-length of the bit series from the second half of the fifth byte delineated by the 1111 in the first half of the sixth byte. Because the terminator is 1111 (TB), this case corresponds to the second line of the table of FIG. 9 where the run-length is 0-1, and 011 is part of the code. "bbbb" representative of the terminator corresponds to "1111", and hence is "1111" (see FIG. 7(b)). Finally, "1" representative of the run-length is placed. Consequently, a code "0111 1111" is formed. The fourth line represents the start of the next line of encoded input image data.

The error data encoded by encoder 121 is transferred through a transmission line to a decoder 123 where it is decoded. An inverse predictor 124 converts the decoded error data to the image data in accordance with the predictor used.

No special code is inserted in the compressed data to indicate which predictor was applied by predictor unit 120. Inverse predictor 124 can determine the predictor used by predictor unit 120 because inverse predictor 124 contains the same predictor selection rules, and because the predictor selected for the current 8-bit data is based on the predictor that would have worked best on the previous 8-bit data. Thus, inverse predictor 124 has the same information available for selecting a predictor as predictor unit 120.

In the following description, it is assumed that raster data is serially input to compandor 103.

FIG. 13 is a diagram of color code assignments according to the preferred embodiment of the present invention. FIG. 13 differs from FIG. 1 discussed in the BACKGROUND OF THE INVENTION in that the codes of black and true red are interchanged with "011" being assigned to true red, and "111," to black. With such an assignment of codes, white information which frequently and successively appears in the text image, is "000 ... ," and successive black information is "111 .. . " Therefore, a high redundancy reduction efficiency ca be attained by the predictive coding and run-length coding.

The increase in compression efficiency for monochromatic image data is achieved at the expense of color image data. Although the compression efficiency of color image data is impaired, the probability of occurrence of color image data is relatively low, and the reduced compression efficiency of color image data, therefore, has little effect on the compression efficiency of the image as a whole.

Figure 1:
FIG. 1 is a table showing a proposed encoding of the image data with color information.

The preferred embodiment has means for translating from the color code assignment of FIG. 1 into the color code assignment of FIG. 13. The translation involves translating a pixel having a color flag bit "0" and gradation bits all "1" into a translated pixel having a color flag bit of "1" and gradation bits all "1" and, conversely, translating a pixel having a color flag bit "1" and gradation bits all "1" into a translated pixel having a color flag bit of "0" and gradation bits all "1."

FIG. 14 is a circuit diagram for detecting a pixel to be translated. A pixel containing a color flag of "0" and gradation bits all of "1" is detected by AND gate 1410.

FIG. 15 is a block diagram of a means for translating pixels having the bit pattern detected by detecting means 130 into pixels having a different bit pattern. Detecting means 130 includes the circuitry described in FIG. 14. The output of detecting means 130 is supplied to the control input of a selector 140. When the detecting means applies a "00" to the control input of selector 140, selector 140 selects the current pixel in the series of pixels. When detecting means 130 applies a "01" to selector 140, indicating that a pixel with a "0" color bit and "1" valued gradation bits is detected, selector 140 selects the data "111." When detecting means 130 applies a "10" to selector 140, indicating that a pixel with a 1 valued color bit and all 1 value gradation bits is detected, selector 140 selects data the "011." Thus, the circuitry described in FIG. 15 is a means for translating from a first pixel value to another pixel value.

With the method for representing image data according to the preferred embodiment of the present invention, the compression efficiency of text image data is enhanced.

Although the preferred embodiment employs a data structure having 3 bits per pixel, the invention may be practiced with data structures having a different number of bits per pixel.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of applicant's general inventive concept.

What is claimed is:

1. An image processing system comprising:
   means for generating a first signal corresponding to an image, the first signal including a series of first pixels, each first pixel having one of a plurality of values;

means for generating a second signal corresponding to the image, the second signal including a series of second pixels, each second pixel having one of the plurality of values, the second signal generating means including means for detecting when a first pixel has a first one of the plurality of values, means for generating a second pixel having a second one of the plurality of values, when the first pixel has the first one of the plurality of values, means for detecting when the first pixel has the second one of the plurality of values, means for generating a second pixel having the first one of the plurality of values, when the first pixel has the second one of the plurality of values, and means for generating a second pixel having the value of the first pixel, when the first pixel has neither the first one nor the second one of the plurality of values; and means for run length encoding the second signal.

2. The image processing system according to claim 1, wherein the second signal generating means includes means for generating the series of second pixels in which the first one of the plurality of values corresponds to a monochromatic pixel, and the second one of the plurality of values corresponds to a color pixel.

3. An image processing system comprising:

means for generating a first signal corresponding to an image, the first signal including a series of first pixels, each first pixel having one of a plurality of bit combinations;

means for generating a second signal corresponding to the image, the second signal including a series of second pixels, each second pixel having one of the plurality of bit combinations, the second signal generating means including means for detecting when a first pixel has a first one of the plurality of bit combinations, means for generating a second pixel having a second one of the plurality of bit combinations, when the first pixel has the first one of the plurality of bit combinations, means for detecting when the first pixel has the second one of the plurality of bit combinations, means for generating a second pixel having the first one of the plurality of bit combinations, when the first pixel has the second one of the plurality of bit combinations, means for generating a second pixel having the bit combination of the first pixel, when the first pixel has neither the first one nor the second one of the plurality of bit combinations, and means for run length encoding the second signal.

4. The image processing system according to claim 3, wherein the second signal generating means includes means for generating a series of pixels in which the first one of the plurality of bit combinations includes a plurality of bits having a common value, and the second one of the plurality of bit combinations includes a plurality of bits in which the value of a first one of the bits is different than the value of a second one of the bits.

5. The image processing system according to claim 3, wherein the second signal generating means includes means for generating a series of pixels in which the first one of the plurality of bit combinations includes a plurality of bits having a type bit of a first value and a plurality of gradation bits, and the second one of the plurality of bit combinations includes a plurality of bits having a type bit of a second value and a plurality of gradation bits.

6. The image processing system according to claim 3, wherein the second signal generating means includes means for generating a series of pixels in which the first one of the plurality of bit combinations includes a plurality of bits having a color flag bit of a first value and a plurality of gradation bits, and the second one of the plurality of bit combinations includes a plurality of bits having a color flag bit of a second value and a plurality of gradation bits.

7. The image processing system according to claim 3, wherein the second signal generating means includes means for generating a series of pixels in which the first one of the plurality of bit combinations includes a plurality of bits having a color flag bit, in a most significant bit position, of a first value and a plurality of gradation bits, and the second one of the plurality of bit combinations includes a plurality of bits having a color flag bit, in the most significant bit position, of a second value and a plurality of gradation bits.

8. The image processing system according to claim 3, wherein the second signal generating means includes means for selecting a bit combination from a set of a first reference bit combination, a second reference bit combination, and the bit combination of the first pixel.

9. In an image processing system, a method of processing an image, comprising the steps, performed by an electronic processor, of:

generating a first signal corresponding to the image, the first signal including a series of first pixels, each first pixel having one of a plurality of values;

generating a second signal corresponding to the image, the second signal including a series of second pixels, each second pixel having one of the plurality of values, including the substeps of detecting when a first pixel has a first one of the plurality of values, generating a second pixel having a second one of the plurality of values, when the first pixel has the first one of the plurality of values, detecting when the first pixel has the second one of the plurality of values, generating a second pixel having the first one of the plurality of values, when the first pixel has the first one of the plurality of values, detecting when the first pixel has the second one of the plurality of values, generating a second pixel having the first one of the plurality of values, when the first pixel has the second one of the plurality of values, and generating a second pixel having the value of the first pixel, when the first pixel has neither the first one nor the second one of the plurality of values; and run length encoding the second signal.

10. The method according to claim 9, wherein the second signal generating step includes the substeps of generating the series of second pixels in which the first one of the plurality of values corresponds to a monochromatic pixel, and the second one of the plurality of values corresponds to a color pixel.

11. In an image processing system, a method of processing an image, comprising the steps, performed by an electronic processor, of:

generating a first signal corresponding to the image, the first signal including a series of first pixels, each first pixel having one of a plurality of bit combinations;

generating a second signal corresponding to the image, the second signal including a series of second pixels, each second pixel having one of the plurality of bit combinations, including the substeps of detecting when a first pixel has a first one of the plurality of bit combinations, generating a second pixel having a second one of the plurality of bit combinations, when the first pixel has the first one of the plurality of bit combinations, detecting when the first pixel has the second one of the plurality of bit combinations, generating a second pixel having eh first one of the plurality of bit combinations, when the first pixel has the second one of the plurality of bit combinations, generating a second pixel having the bit combination of the first pixel, when the first pixel has neither the first one nor the second one of the plurality of bit combinations, and run length encoding the second signal.

12. The image processing system according to claim 11, wherein the second signal generating step includes the substep of generating a series a pixels in which the first one of the plurality of bit combinations includes a plurality of bits having a common value, and the second one of the plurality of bit combinations includes a plurality of bits in which the value of a first one of the bits is different than the value of a second one of the bits.

13. The method according to claim 11, wherein the second signal generating step includes the substep of generating a series of pixels in which the first one of the plurality of bit combinations includes a plurality of bits having a type bit of a first value and a plurality of gradation bits, and the second one of the plurality of bit combinations includes a plurality of bits having a type bit of a second value and a plurality of gradation bits.

14. The method according to claim 11, wherein the second signal generating step includes the substep of generating a series of pixels in which the first one of the plurality of bit combinations includes a plurality of bits having a color flag bit of a first value and a plurality of gradation bits, and the second one of the plurality of bit combinations includes a plurality of bits having a color flag bit of a second value and a plurality of gradation bits.

15. The method according to claim 11, wherein the second signal generating step includes the substep of generating a series of pixels in which the first one of the plurality of bit combinations includes a plurality of bits having a color flag bit, in a most significant bit position, of a first value and a plurality of gradation bits, and the second one of the plurality of bit combinations includes a plurality of bits having a color flag bit, in the most significant bit position, of a second value and a plurality of gradation bits.

16. The method according to claim 11, wherein the second signal generating step includes the substep of selecting a bit combination pixel from the set of a first reference bit combination, a second reference bit combination, and the bit combination of the first pixel.

17. The method according to claim 11, wherein the run length encoding step includes the substep of predicting the second signal.

* * * * *

UNITED STATES PATENT AND TRADEMARK OFFICE
CERTIFICATE OF CORRECTION

PATENT NO. : 5,198,898
DATED : March 30, 1993
INVENTOR(S) : Masahiko Miyata

It is certified that error appears in the above-indentified patent and that said Letters Patent is hereby corrected as shown below:

Claim 9, column 8, delete lines 50-54 in their entirety.

Claim 10, column 9, line 20, change "eh" to --the--.

Signed and Sealed this

Eighth Day of March, 1994

Attest:

BRUCE LEHMAN

*Attesting Officer*   *Commissioner of Patents and Trademarks*